United States Patent
Wu et al.

(10) Patent No.: US 9,194,998 B2
(45) Date of Patent: Nov. 24, 2015

(54) BACKLIGHT MODULE

(71) Applicant: RADIANT OPTO-ELECTRONICS CORPORATION, Kaohsiung (TW)

(72) Inventors: Sung-Fu Wu, Kaohsiung (TW); Yi-Jen Chiu, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 14/161,897

(22) Filed: Jan. 23, 2014

(65) Prior Publication Data
US 2015/0036383 A1 Feb. 5, 2015

(30) Foreign Application Priority Data
Aug. 2, 2013 (TW) .............................. 102127822 A

(51) Int. Cl.
*F21V 8/00* (2006.01)

(52) U.S. Cl.
CPC .............. *G02B 6/0085* (2013.01); *G02B 6/009* (2013.01); *G02B 6/0068* (2013.01); *G02B 6/0073* (2013.01)

(58) Field of Classification Search
CPC ... G02B 6/0081; G02B 6/0085; G02B 6/0073
USPC .................................. 362/612–613, 630–634
See application file for complete search history.

(56) References Cited

U.S. PATENT DOCUMENTS

| 8,382,361 B2 * | 2/2013 | Park ............................... 362/631 |
| 8,459,857 B2 * | 6/2013 | Shibata et al. ................ 362/613 |
| 8,616,737 B2 * | 12/2013 | Lim et al. ...................... 362/373 |
| 8,911,124 B2 * | 12/2014 | Lim et al. ...................... 362/373 |
| 2012/0320629 A1 | 12/2012 | Lim et al. |
| 2013/0194825 A1 * | 8/2013 | Nam et al. .................... 362/613 |

FOREIGN PATENT DOCUMENTS

| CN | 103162271 A | 6/2013 |
| TW | I349141 | 9/2011 |

OTHER PUBLICATIONS

Chinese Search Report issued in Application No. 2013103348553 dated Feb. 28, 2015 w/ partial translation.
Taiwanese Search Report issued in Application No. 102127822 dated May 28, 2015 (w/trans).

* cited by examiner

*Primary Examiner* — Anabel Ton
(74) *Attorney, Agent, or Firm* — Nixon & Vanderhye P.C.

(57) ABSTRACT

A frame structure for a back light module includes a horizontal base plate, a vertical back plate that has a bottom end connected to an upper side of the base plate, and an elongated horizontal through hole formed in a predetermined zone between ⅓ and ¼ of a vertical height of the back plate from the bottom end, and a heat sink that extends from the upper side of the base plate and that has a top end which is below a bottom end of the horizontal through hole. The backlight module further includes a light source disposed on the upper side of the base plate and a light guiding plate disposed to correspond in position to the light source for receiving light emitted from the light source.

20 Claims, 2 Drawing Sheets

BACKLIGHT MODULE

CROSS-REFERENCE TO RELATED APPLICATION

This application claims priority of Taiwanese Application No. 102127822, filed on Aug. 2, 2013.

BACKGROUND OF THE INVENTION

1. Field of the Invention

The invention relates to lighting module, particularly to a backlight module.

2. Description of the Related Art

Backlight modules are commonly utilized in various flat screen displays. A backlight module usually includes a light source, a back plate and a light guiding plate. As the structure of the display becomes ever thinner, the light source generates heat that tends to cause bending of the back plate.

The most common solution presently is adding a heat sink to help conduct and dissipate the heat. However, such design does not dissipate heat efficiently enough to prevent the back plate from bending cause by the heat.

SUMMARY OF THE INVENTION

Therefore, the object of the present invention is to provide a backlight module that can eliminate the aforesaid drawback of the prior art.

According to the present invention, there is provided a backlight module comprising a frame structure that includes a horizontal base plate, a vertical back plate and a heat sink. The back plate has a bottom end connected to an upper side of the base plate, and an elongated horizontal through hole formed in a predetermined zone between ⅓ and ¼ of a vertical height of the back plate from the bottom end. The heat sink extends from the upper side of the base plate and has a top end that is below a bottom end of the horizontal through hole.

The backlight module further includes a light source disposed on the upper side of the base plate and a light guiding plate disposed to correspond in position to the light source for receiving light emitted from the light source.

The advantage of the present invention is that the horizontal through hole segregates the heat, substantially reduces the amount of heat passing to the upper side of the back plate, and effectively prevents bending of the back plate caused by the heat.

DETAILED DESCRIPTION OF THE PREFERRED EMBODIMENT

Figure 1:
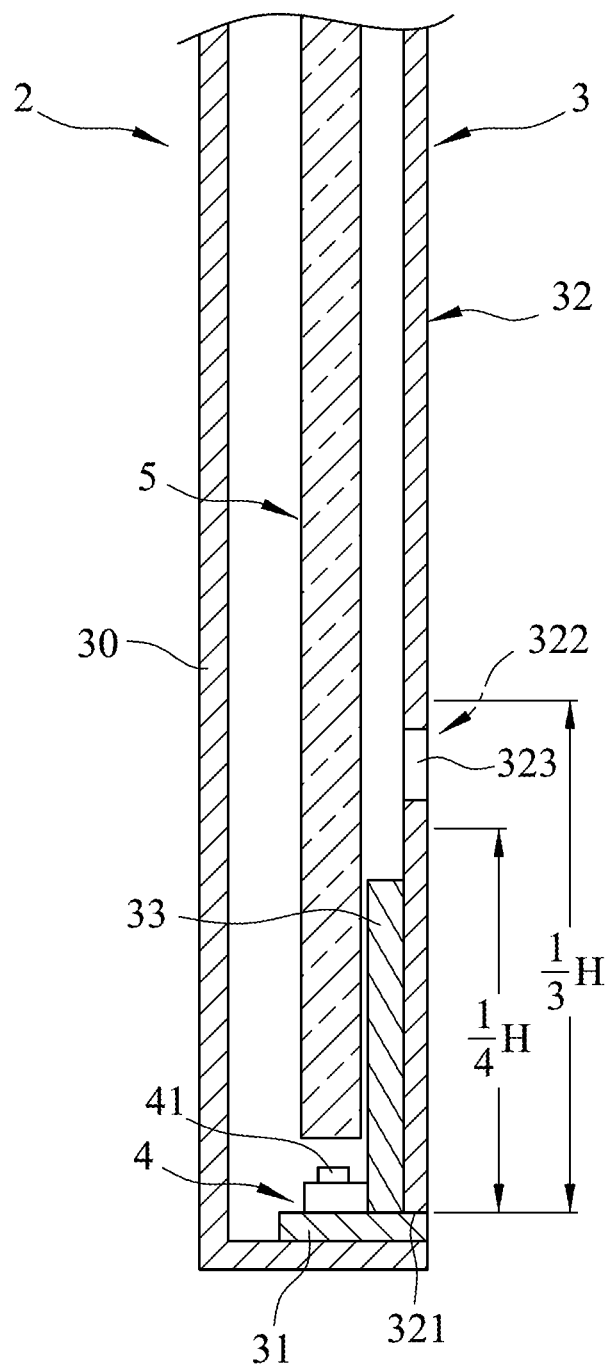
FIG. 1 is a fragmentary schematic sectional view of the preferred embodiment of a backlight module according to the present invention.
Figure 2:
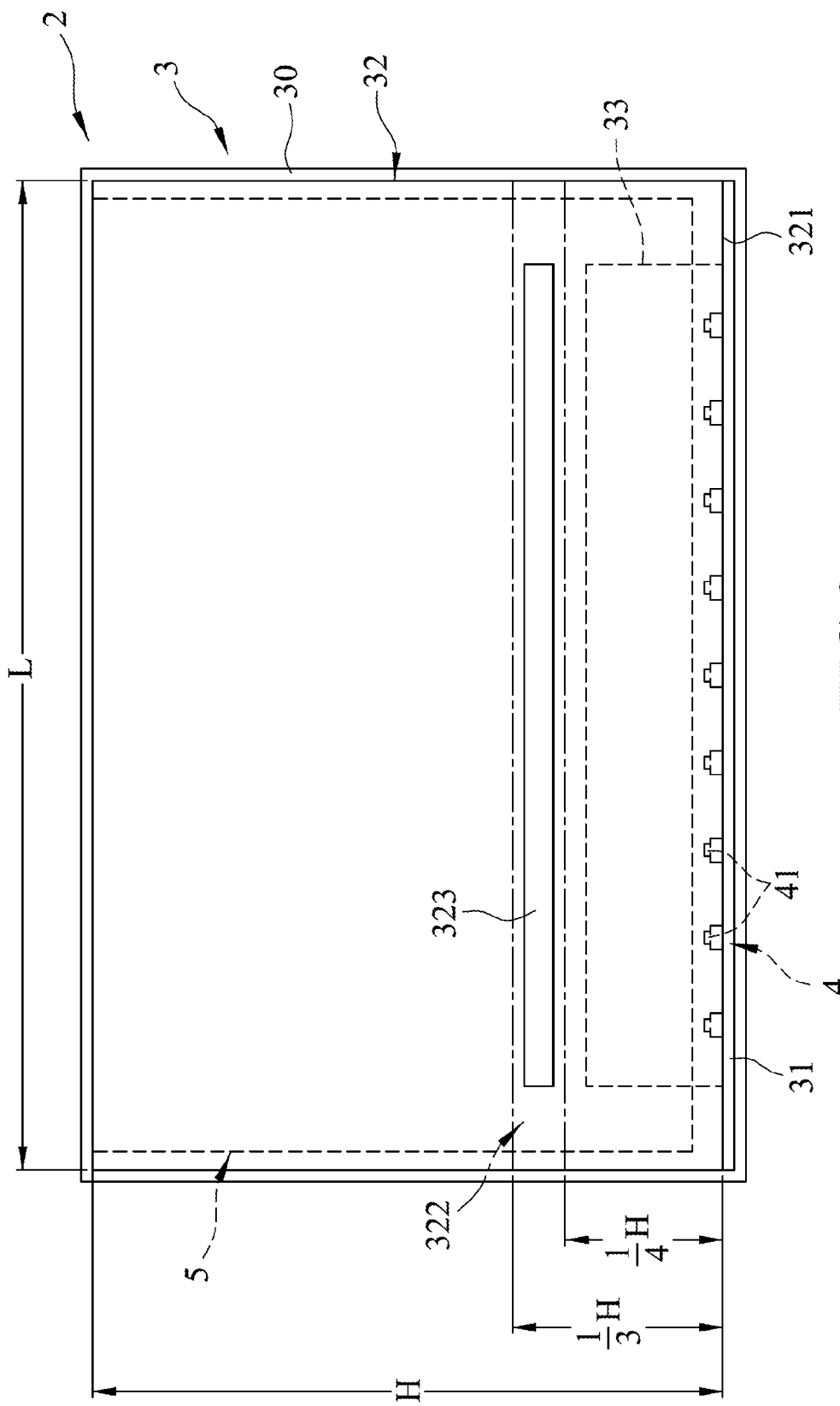
FIG. 2 is a front schematic view of the preferred embodiment.

With reference to FIGS. 1 and 2, the preferred embodiment of a backlight module 2 according to the present invention includes a frame structure 3, a light source 4 disposed on the frame structure 3, and a light guiding plate 5 disposed to correspond in position to the light source 4 for receiving light emitted from the light source 4.

The frame structure 3 includes an outer frame 30, a horizontal base plate 31 that is horizontally disposed on the outer frame 30, a vertical back plate 32 that is vertically disposed on an upper side of the base plate 31, and a heat sink 33 that is disposed on the back plate 32 and that extends from the upper side of the base plate 31.

The light source 4 is disposed on the upper side of the horizontal base plate 31 and includes a plurality of spaced-apart light emitting diodes (LEDs) 41. The light guiding plate 5 is disposed on the outer frame 30 to correspond in position to the light source 4 for receiving light emitted by the light source 4. It should be noted that the structure of the outer frame 30, and the relationship between the outer frame 30 and the light guiding plate 5 are not the focus of the present invention and will not be illustrated and discussed further in detail.

The back plate 32 has a bottom end 321 that is connected to the upper side of the back plate 32, a predetermined zone 322 between ⅓ and ¼ of a vertical height (H) of the back plate 32 from the bottom end 321, and an elongated horizontal through hole 323 formed within the predetermined zone 322. A horizontal length of the horizontal through hole 323 is not less than 80% of a horizontal length (L) of the back plate 32. The heat sink 33 has a top end that is disposed below a bottom end of the through hole 323 for dissipating heat generated by the LEDs 41. In this embodiment, the horizontal through hole 323 is substantially disposed at the center of the predetermined zone 322.

The heat generated by the LEDs 41 is conducted to the back plate 32 via the base plate 31 and the heat sink 33. The heat is limited below the horizontal through hole 323 because the heat sink 33 is disposed below the horizontal through hole 323 and because the horizontal length of the horizontal through hole 323 is at least 80% of the horizontal length (L) of the back plate 32. In effect, the horizontal through hole 323 segregates the heat, substantially reduces the amount of heat passing to the upper side of the back plate 32, and effectively prevents bending of the back plate 32 caused by the heat.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A backlight module comprising:
    a frame structure including
        a horizontal base plate,
        a vertical back plate that has a bottom end connected to an upper side of said base plate, and an elongated horizontal through hole formed therein, and
        a heat sink that extends from said upper side of said base plate and that has a top end which is below a bottom end of said horizontal through hole;
    a light source disposed on said upper side of said base plate and directly contacting said base plate and said heat sink; and
    a light guiding plate disposed to correspond in position to said light source for receiving light emitted from said light source, said heat sink being located between said light guiding plate and said vertical back plate.

2. The backlight module of claim 1, wherein said horizontal through hole has a horizontal length of at least 80% of a horizontal length of said back plate.

3. The backlight module of claim 1, wherein said horizontal through hole is formed in the center of said predetermined zone.

4. The backlight module of claim 1, wherein said light source includes a plurality of spaced-apart light emitting diodes.

5. A backlight module comprising:
a frame structure including
a base plate,
a back plate that is mounted on said base plate,
a ventilation outlet that is formed in said back plate, and
a heat sink that is located between said base plate and said back plate, and that is below said ventilation outlet;
a light source disposed on said base plate; and
a light guiding plate disposed to correspond in position to said light source for receiving light emitted from said light source, and having a top end not lower than that of said back plate of said frame structure.

6. The backlight module of claim 5, wherein said ventilation outlet is an elongated horizontal through hole.

7. The backlight module of claim 6, wherein said horizontal through hole has a horizontal length of at least 80% of a horizontal length of said back plate.

8. The backlight module of claim 6, wherein said horizontal through hole is formed in the center of said predetermined zone.

9. The backlight module of claim 5, wherein said light source includes a plurality of spaced-apart light emitting diodes.

10. The backlight module of claim 1, wherein said elongated horizontal through hole of said vertical back plate is formed within a predetermined zone between $\frac{1}{3}$ and $\frac{1}{4}$ of a vertical height of said back plate from said bottom end.

11. The backlight module of claim 1, wherein said heat sink directly contacts said vertical back plate.

12. The backlight module of claim 5, wherein said ventilation outlet is formed within a predetermined zone between $\frac{1}{3}$ and $\frac{1}{4}$ of a vertical height of said back plate from a bottom end of said back plate.

13. The backlight module of claim 5, wherein said light source directly contacts said base plate and said heat sink, said heat sink being located between said light guiding plate and said back plate.

14. The backlight module of claim 13, wherein said heat sink directly contacts said back plate.

15. The backlight module of claim 5, wherein said back plate has an upper portion and a lower portion which is connected to said upper portion, said ventilation outlet being located between said upper portion and said lower portion.

16. The backlight module of claim 5, wherein said light guiding plate is entirely received on said back plate of said frame structure.

17. A backlight module comprising:
a frame structure including
a back plate,
a ventilation outlet that is formed in said back plate, and
a heat sink that is below said ventilation outlet;
a light source that contacts said heat sink; and
a light guiding plate disposed to correspond in position to said light source for receiving light emitted from said light source, said heat sink being located between said light guiding plate and said back plate.

18. The backlight module of claim 17, wherein said ventilation outlet is formed within a predetermined zone between $\frac{1}{3}$ and $\frac{1}{4}$ of a vertical height of said back plate from a bottom end of said back plate.

19. The backlight module of claim 17, wherein said frame structure further includes a base plate which is connected to said back plate, said light source directly contacting said base plate and said heat sink.

20. The backlight module of claim 17, wherein said heat sink directly contacts said back plate.

* * * * *